(12) United States Patent  
Shiraishi

(10) Patent No.: US 7,509,006 B2  
(45) Date of Patent: Mar. 24, 2009

(54) OPTICAL DEVICE

(75) Inventor: Takashi Shiraishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/456,965

(22) Filed: Jul. 12, 2006

(65) Prior Publication Data

US 2007/0274637 A1 Nov. 29, 2007

(30) Foreign Application Priority Data

Apr. 27, 2006 (JP) ............................. 2006-123701

(51) Int. Cl.
*G02F 1/295* (2006.01)
*G02F 1/03* (2006.01)
*G02F 1/07* (2006.01)
*G02B 6/26* (2006.01)
*G02B 6/42* (2006.01)

(52) U.S. Cl. ................. 385/40; 385/4; 385/8; 385/39; 359/245; 359/254

(58) Field of Classification Search ................. 385/40
See application file for complete search history.

(56) References Cited

U.S. PATENT DOCUMENTS

| 5,748,358 A | 5/1998 | Sugamata et al. |
| 5,835,261 A | 11/1998 | Tamanuki et al. |
| 5,920,662 A * | 7/1999 | Hinkov .................. 385/14 |
| 6,778,313 B2 * | 8/2004 | Kambe ................. 359/279 |
| 2005/0196102 A1 | 9/2005 | Yamazaki et al. |

FOREIGN PATENT DOCUMENTS

| JP | 62-103604 | 5/1987 |
| JP | 2793562 | 6/1998 |
| JP | 2817769 | 8/1998 |
| JP | 2005-284256 | 10/2005 |

* cited by examiner

*Primary Examiner*—Hemang Sanghavi
*Assistant Examiner*—Kajli Prince
(74) *Attorney, Agent, or Firm*—Staas & Halsey LLP

(57) ABSTRACT

An optical device wherein an optical waveguide is formed on a dielectric substrate, the optical device includes an input part and an output part where the optical waveguide and corresponding optical fibers are connected. A stress layer is provided for at least one of the input part and the output part. The stress layer applies a stress to the optical waveguide so that an index of refraction of the optical waveguide is reduced.

14 Claims, 13 Drawing Sheets

US 7,509,006 B2

OPTICAL DEVICE

BACKGROUND OF THE INVENTION

1. Field of the Invention

The present invention generally relates to optical devices, and more specifically, to an optical device used in technical fields such as optical communication or optical signal processing.

2. Description of the Related Art

As for recent and continuing development of optical communication systems, a system having a large capacity and high functions has been requested. Hence, it is required to develop an optical device such as an optical switch or modulator for high speed optical wave. In such an optical device, not only high speed but also low loss or low voltage is required.

As the high speed optical device, for example, an optical switch, an optical modulator, and an optical control element are reported wherein a waveguide is formed in a substrate made of a crystal of lithium niobate ($LiNbO_3$) having a large electrooptic coefficient and the change of the index of refraction of the waveguide is controlled by changing it in an electric field by using the electrooptic effect.

The optical waveguide having a structure where a metal such as titanium (Ti) or the like is diffused in the crystal of lithium niobate ($LiNbO_3$) obtains low propagation loss equal to or less than 0.1 dB/cm for a wavelength of 1550 nm.

However, in order to use the optical device using such a diffusion waveguide (optical waveguide) in an optical fiber transmission system, it is necessary to consider the coupling loss with the optical fiber.

In addition, in a case where the optical waveguide is three-dimensionally formed on the dielectric substrate by using a femto-second laser or high intensity laser, it is well known that the cross section of the waveguide becomes elliptic. Because of this, it is necessary to consider the coupling loss similar to the above-mentioned diffusion waveguide.

FIG. 1 is a schematic view showing a light intensity distribution of light propagating in an optical fiber and a light intensity distribution of light propagating in a diffusion waveguide of an optical waveguide element, in the related art.

The intensity (mode) distribution of the light propagating in the optical fiber is circular shaped as shown in FIG. 1-(a). On the other hand, in the optical device using the diffusion waveguide, as shown in FIG. 1-(b), the distribution of the indices of refraction between the direction perpendicular to the substrate, namely substrate depth direction, and the direction parallel to the substrate are different. The intensity distribution of the light is extremely different from the circular shape and is substantially elliptical in shape.

FIG. 2 provides graphs of the distribution of the change of the index of refraction in the direction perpendicular to the substrate, namely the substrate depth direction, and parallel to the horizontal with the substrate, in the related art optical device.

The intensity distribution of the light in the diffusion waveguide is defined by a principle of the diffusion. The diffusion waveguide receives diffusing atoms from an upper side. Hence, the distribution of the index of refraction horizontal (parallel) to the substrate has, as shown in FIG. 2-(b), a substantially symmetric shape. On the other hand, the distribution of the change of the index of refraction in the direction perpendicular to the substrate, namely the substrate depth direction is, as shown in FIG. 2-(a), leans (is skewed) toward the surface of the substrate. Because of this, when the diffusion waveguide is inserted between the optical fibers, coupling loss of approximately 2 dB in total at the input and output parts may be incurred.

Therefore, in order to reduce the coupling loss between the diffusion waveguide and the optical fibers, it is necessary to make the distribution of the change of the index of refraction of the diffusion waveguide at the optical input and output parts similar to the substantially circular-shaped light intensity distribution of the optical fiber.

On the other hand, in the optical control part, it is possible to obtain high electric field application efficiency when the light intensity distribution leans toward the vicinity of an electrode having a high strength applied electronic field.

In order to solve the above-discussed problems a method is suggested in Japanese Laid Open Patent Application Publication No. 62-103604 whereby a titanium (Ti) diffusion waveguide is formed and then magnesium oxide (MgO) is additionally diffused so that the index of refraction of the surface is decreased.

In addition, Japanese Laid Open Patent Application Publication No. 2005-284256 discloses a waveguide-type optical splitter having a structure where a waveguide for input, plural waveguides for output and a slab waveguide are formed on a substrate. The slab waveguide has an incident end and an output end. The output end has a circular shape centered around the incident end or its vicinity. The waveguide for input is connected to the incident end and the plural waveguides for output are connected to the output end. The waveguide for input is connected to the incident end via a waveguide, whose opening width is narrowed and tapered.

Furthermore, Japanese Patent No. 2793562 discloses a structure where an optical waveguide is formed on a substrate of lithium niobate ($LiNbO_3$) and the optical waveguide is formed by effecting thermal diffusion of titanium (Ti).

In addition, Japanese Patent No. 2817769 discloses a semiconductor optical amplifier device including a semiconductor laser section and a semiconductor optical amplifier both of which are formed on the same semiconductor substrate and which are coupled to each other, the semiconductor optical amplifier including a waveguide layer formed on the semiconductor substrate and a tapered electrode formed on an upper surface thereof, the semiconductor optical amplifier being supplied with an incident laser beam from the semiconductor laser section through an incident surface and amplifying the incident laser beam to emit an amplified laser beam as an output laser beam through an emission surface, the tapered electrode spreading toward the emission surface.

However, in the process discussed in Japanese Laid Open Patent Application Publication No. 62-103604, after titanium (Ti) is diffused, deposition and thermal diffusion of magnesium oxide (MgO) are required and therefore the number of the processes is increased.

Furthermore, in a case where lithium niobate ($LiNbO_3$) is used as a dielectric substrate, out diffusion of lithia ($Li_2O$) from inside of lithium niobate ($LiNbO_3$) is expected due to the diffusion of magnesium oxide (MgO). Therefore, it is difficult to achieve a desirable refractive index profile.

In addition, for example, if the out diffusion of lithia ($Li_2O$) happens too much, the ratio of lithium (Li) and niobium (Nb) in a crystal may be changed and therefore a decrease of electrooptic coefficient would be expected.

SUMMARY OF THE INVENTION

Accordingly, the present invention may provide a novel and useful optical device solving one or more of the problems discussed above.

Another and more specific object of the present invention may be to provide an optical device having a structure where the light intensity distribution of an optical waveguide is substantially consistent with the light intensity distribution of an optical fiber for at least one of optical input and output parts (parts connecting the optical device and the optical fiber) and therefore there is little coupling loss.

The above object of the present invention is achieved by an optical device wherein an optical waveguide is formed on a dielectric substrate, the optical device including an input part and an output part where the optical waveguide and corresponding optical fibers are connected; wherein a stress layer is provided for at least one of the input part and the output part; and the stress layer applies a stress to the optical waveguide so that an index of refraction of the optical waveguide is reduced.

The stress layer may be formed in a taper shape; and the stress applied to the optical waveguide may be weakened as a position approaches from the at least one of the input part and the output part to the control part where an electrode is provided. Width of the stress layer may be formed in a taper shape. Thickness of the stress layer may be formed in a taper shape.

The optical waveguide may be put between a plurality of the stress layers at the at least one of the input part and the output part, in a case where the dielectric substrate is made of a material having a positive photoelastic coefficient and a coefficient of thermal expansion of the stress layer is larger than a coefficient of thermal expansion of the dielectric substrate.

The optical waveguide may be put between a plurality of the stress layers at the at least one of the input part and the output part, in a case where the dielectric substrate is made of a material having a negative photoelastic coefficient and a coefficient of thermal expansion of the stress layer is smaller than a coefficient of thermal expansion of the dielectric substrate.

The stress layer may be provided on the optical waveguide at the at least one of the input part and the output part, in a case where the dielectric substrate is made of a material having a positive photoelastic coefficient and a coefficient of thermal expansion of the stress layer is smaller than a coefficient of thermal expansion of the dielectric substrate.

The stress layer may be provided on the optical waveguide at the at least one of the input part and the output part, in a case where the dielectric substrate is made of a material having a negative photoelastic coefficient and a coefficient of thermal expansion of the stress layer is larger than a coefficient of thermal expansion of the dielectric substrate.

According to an embodiment of the present invention, it is possible to provide the optical device having the structure where the light intensity distribution of the optical waveguide is substantially consistent with the light intensity distribution of the optical fiber for at least one of the optical input and output parts (the parts connecting the optical device and the optical fibers) and therefore there is little coupling loss.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 3 through FIG. 13 of embodiments of the present invention.

1. First Embodiment of the Present Invention

Figure 3:
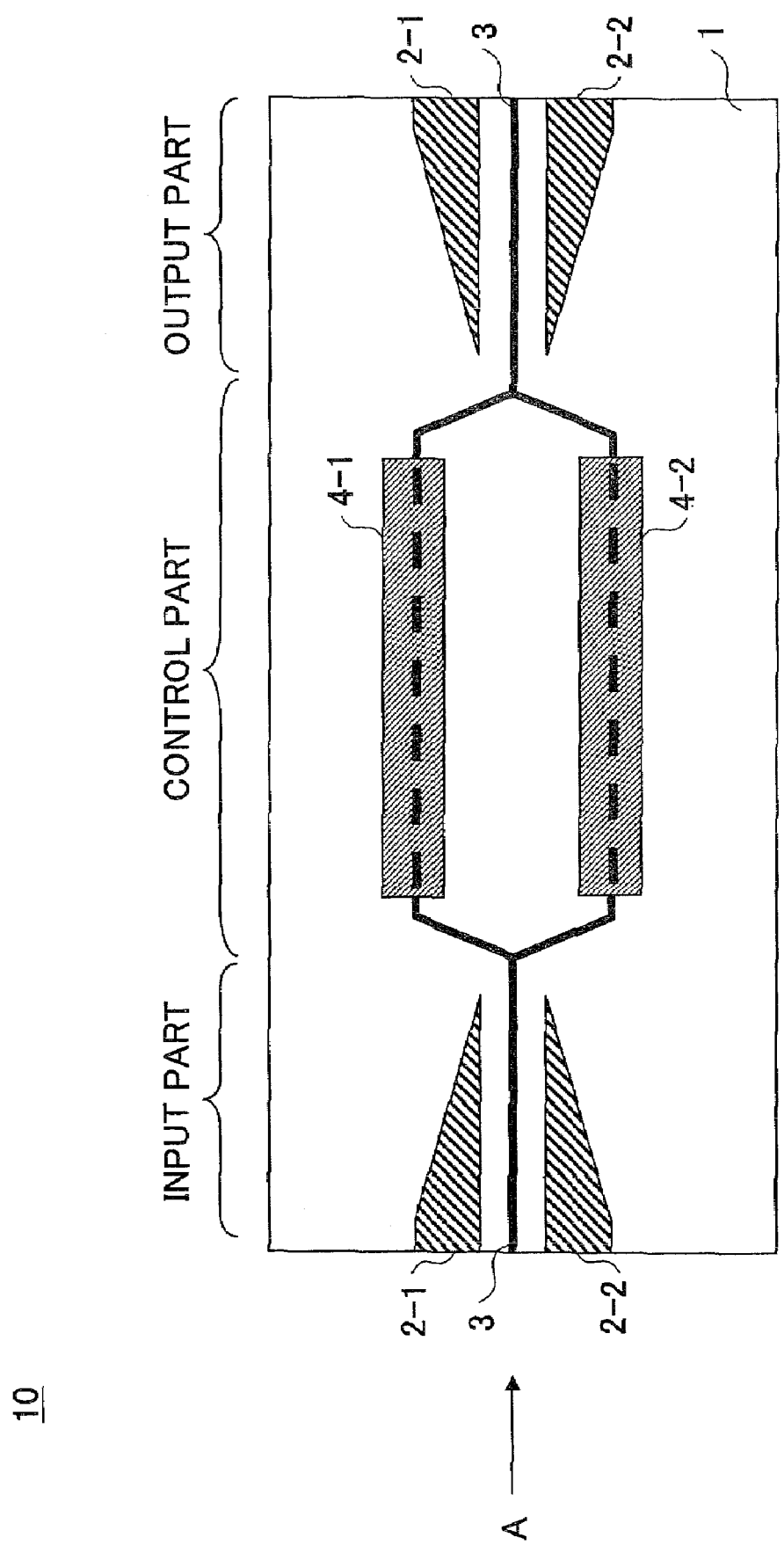
FIG. 3 is a plan view showing a schematic structure of an optical device of a first embodiment of the present invention.
Figure 4:
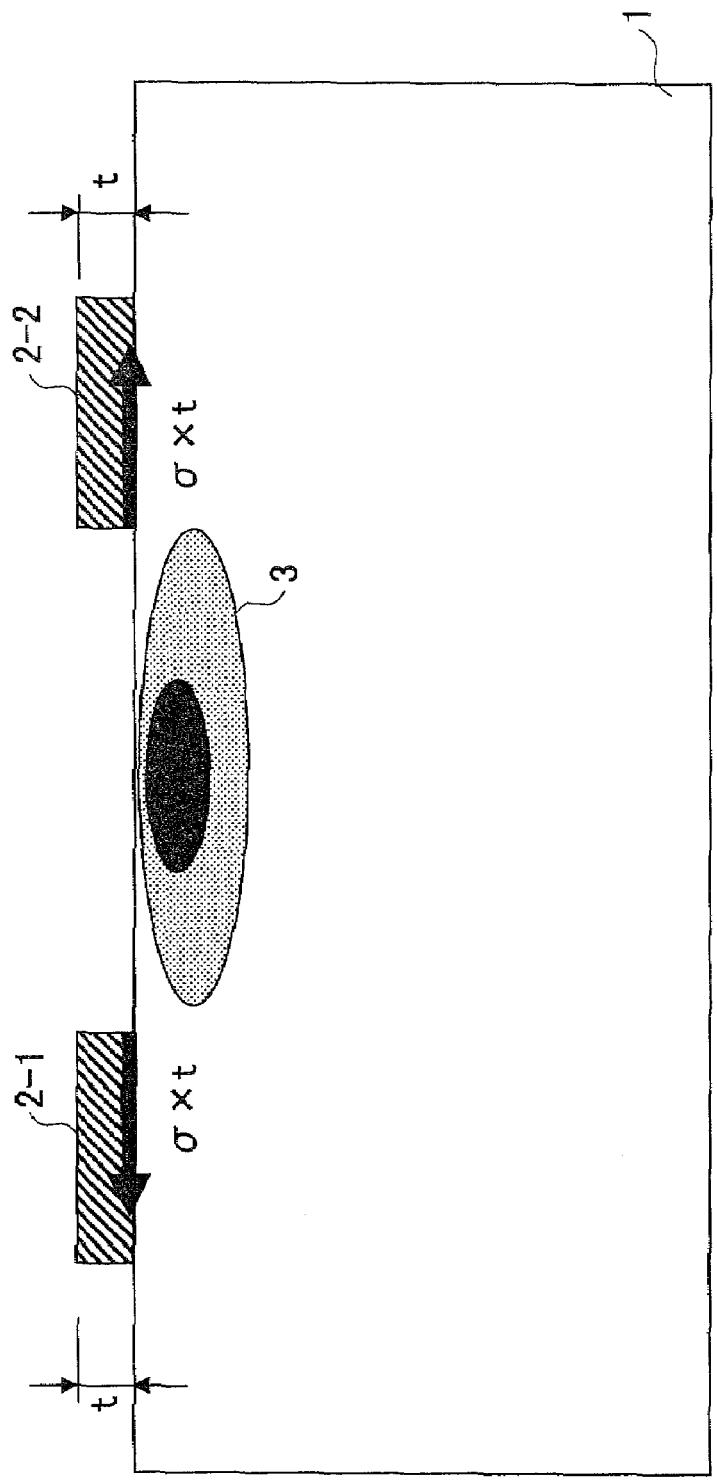
FIG. 4 is a schematic view seen in a direction shown by an arrow A of the optical device shown in FIG. 3.

FIG. 3 is a plan view showing a schematic structure of an optical device of a first embodiment of the present invention. FIG. 4 is a schematic view seen in a direction shown by an arrow A of the optical device shown in FIG. 3.

In FIG. 3 and FIG. 4, an example where the present invention is applied to a Mach-Zehnder type optical modulator is shown as an optical device 10.

Referring to FIG. 3, the Mach-Zehnder type optical modulator is formed as the optical device 10. The optical device 10 has a structure where a waveguide (optical waveguide) 3 is formed on a dielectric substrate 1 having a photoelastic effect such as lithium niobate ($LiNbO_3$). The waveguide (optical waveguide) 3 is made by diffusing metal atoms such as titanium (Ti).

The dielectric substrate 1 made of lithium niobate ($LiNbO_3$), as well as a substrate made of lithium tantalate ($LiTaO_2$) discussed below, have large electrooptic coefficients. Hence, it is possible to form a diffusion waveguide having low loss on the dielectric substrate 1. Furthermore, as a material for being diffused on the dielectric substrate 1, in addition to titanium (Ti), zinc (Zn), nickel (Ni), or the like may be used.

The optical device 10 includes an input part, a control part, and an output part.

In the control part, modulating electrodes 4-1 and 4-2 are provided in parallel. By applying a radio frequency (RF) voltage to the modulating electrodes 4-1 and 4-2, the optical path length of light is changed due to an electrooptic effect so that intensity modulation of the light is performed.

In the input part and the output part, the stress layers 2-1 and 2-2 are patterned and provided so that the diffusion waveguide 3 is put between the stress layers 2-1 and 2-2.

Referring to FIG. 4, the stress layers 2-1 and 2-2 make the diffusion waveguide 3 put between the stress layers 2-1 and 2-2 have a stress inducing the change of the index of refraction due to a photoelastic effect.

In other words, a stress "σ×t (t: thickness of the stress layers 2-1 and 2-2)" is given to the diffusion waveguide 3 put between the stress layers 2-1 and 2-2 so that expansion strain acts on a surface of the diffusion waveguide 3. As a result of this, the change of the index of refraction is induced due to a photoelastic effect and therefore the index of refraction of the surface of the substrate 1 is decreased.

Under this structure, the light intensity distribution of the diffusion waveguide 3 in the input part and the output part can be made to have similar substantially circular shapes, the circular shape being the light intensity distribution of the optical fibers. As a result of this, it is possible to reduce the coupling loss of the optical fibers and the input and output parts.

Referring back to FIG. 3, it is necessary to improve the application efficiency of the electric field in the control part. Therefore, it is preferable to make the light intensity distribution lean toward the vicinities of the electrodes 4-1 and 4-2 having large strengths of the application electric fields, namely make the light intensity distribution lean toward the surface of the substrate like a normal diffusion waveguide.

Because of this, the stress layers 2-1 and 2-2 are provided only at the input and output parts so that a decreasing degree of the index of refraction is most at the input and output parts. On the other hand, the stress layers 2-1 and 2-2 are not provided at the control part.

At the input and output parts, the width of the stress layers 2-1 and 2-2 are formed in taper shapes so as to be narrower as a position approaches the control part. As a result of this, the stresses applied by the stress layers 2-1 and 2-2 are gradually weakened and changed so that the coupling loss is prevented.

In the meantime, while the width of the stress layers 2-1 and 2-2 are formed in taper shapes so as to be narrower as the position approaches the control part in the example shown in FIG. 3 as discussed above, the present invention is not limited to this. The present invention may be applied to an example shown in FIG. 5. Here, FIG. 5 is a perspective view of an optical device of a modified example of the first embodiment of the present invention.

Figure 5:
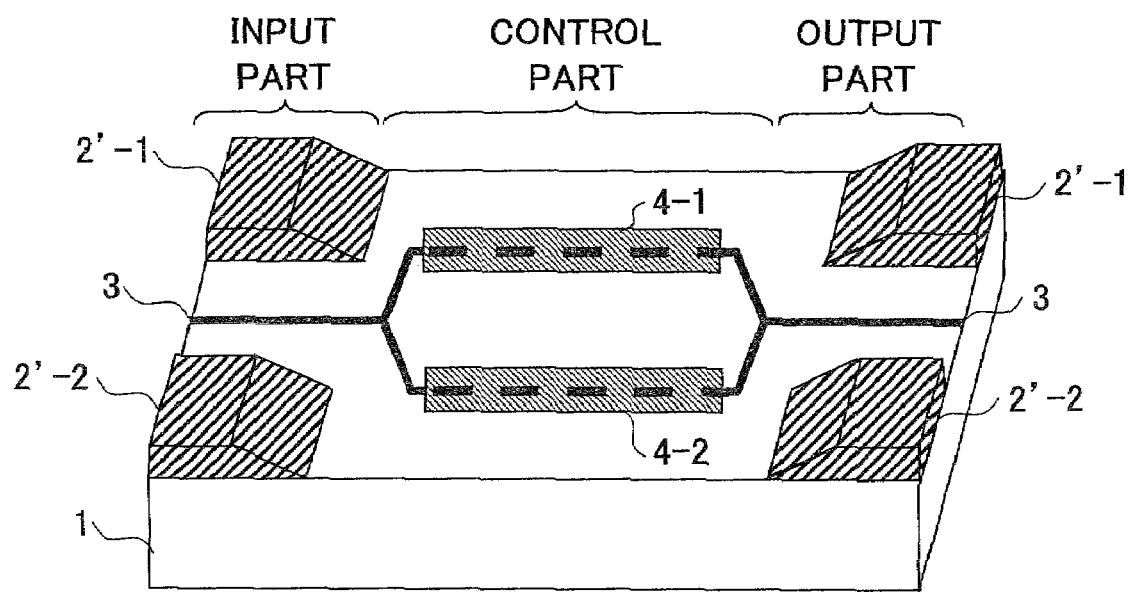
FIG. 5 is a perspective view of an optical device of a modified example of the first embodiment of the present invention.

Referring to FIG. 5, in this example, thicknesses of stress layers 2'-1 and 2'-2 are formed in taper shapes at the input and output parts so as to be thinner as the position approaches the control part. In the structure of this example, the stresses applied by the stress layers 2'-1 and 2'-2 can be gradually weakened and changed so that the same effect as that of the example shown in FIG. 3 can be achieved.

Meanwhile, the stress layers 2-1 and 2-2 can be formed by, for example, an evaporation method or a sputtering method. It is preferable to form the stress layers 2-1 and 2-2 as thin films at approximately 50 through 500° C.

Here, "$\alpha_s$" represents a coefficient of thermal expansion of the substrate 1. "$\alpha_f$" represents coefficients of thermal expansion of the stress layers 2-1 (2'-1) and 2-2 (2'-2). The stress layers 2-1 (2'-1) and 2-2 (2'-2) having thickness of "t" μm are formed on the substrate 1 at "T" ° C. When the temperature is turned back to room temperature (normal temperature) $T_0$, a stress "$\sigma_{th}$" is generated at the substrate 1 due to the difference of the coefficients of thermal expansion. The "$\sigma_{th}$" is calculated by the following formula 1.

$$\sigma_{th} = \frac{E_f \Delta T (\alpha_s - \alpha_f)}{1 - v_f} \quad \text{[Formula 1]}$$

Here, $\Delta T = (T - T_0)$. In addition, $E_f$ represents Young's modulus and $v_f$ represents Poisson's ratio of the stress layer.

In addition, the stress σ when the thin film is formed is generally expressed as "$\sigma = \sigma_{int} + \sigma_{th}$". Here, $\sigma_{int}$ is called a true (intrinsic) stress and is a stress at the time of deposition not based on heat. As discussed above, "$\sigma_{th}$" is a stress generated by the difference of the coefficients of thermal expansion.

As discussed above, the strain S is generated at the diffusion waveguide 3 put between the stress layers 2-1 (2'-1) and 2-2 (2'-2). The relationship between the strain S and the stress σ is found by calculating an elastic equation with an elastic constant of the substrate 1.

When the value of the stress σ is positive, the generated strain S is positive. When the value of the stress σ is negative, the generated strain S is negative. The value of the stress σ is proportional to the value of the strain S.

In addition, if the strain S is applied to the substrate 1 having an electrooptic effect, the index of refraction is changed. The change of the index of refraction due to the electrooptic effect is calculated by the following formula 2.

$$\Delta n = -\frac{1}{2} n^3 p S \quad \text{[Formula 2]}$$

Here, "n" represents the index of refraction. "S" represents the strain applied to the substrate. "p" represents a photoelastic coefficient.

For example, when the substrate 1 is made of a material having a positive photoelastic coefficient such as lithium niobate ($LiNbO_3$), a material (for example, polyimide, aluminum (Al), or the like) having a coefficient of thermal expansion larger than that of lithium niobate ($LiNbO_3$) ($\alpha_s < \alpha_f$) is selected for the stress layers 2-1 (2'-0) and 2-2 (2'-2). By generating the expansion stress σ having a positive value at the substrate 1 and making the generated strain S have a positive value (expansion strain), it is possible to decrease the index of refraction (namely to make Δn have a negative value).

On the other hand, when the substrate 1 is made of a material having a negative photoelastic coefficient such as gallium arsenide (GaAs), a material (for example, silicon oxide ($SiO_2$), silicon nitride (SiN), or the like) having a coefficient of thermal expansion smaller than that of gallium arsenide (GaAs) ($\alpha_s > \alpha_f$) is selected for the stress layers 2-1 (2'-1) and 2-2 (2'-2). As a result of this, it is possible to decrease the index of refraction (namely to make Δn have a negative value).

Thus, it is possible to generate the stress decreasing the index of refraction by a thermal stress or the like due to the deposition of the thin film and possible to reduce the process of additional diffusion. In addition, since there is no damage received by the substrate, the electrooptic coefficient or out diffusion is not changed. Hence, it is possible to easily obtain a desirable distribution of the index of refraction.

2. Second Embodiment of the Present Invention

Figure 6:
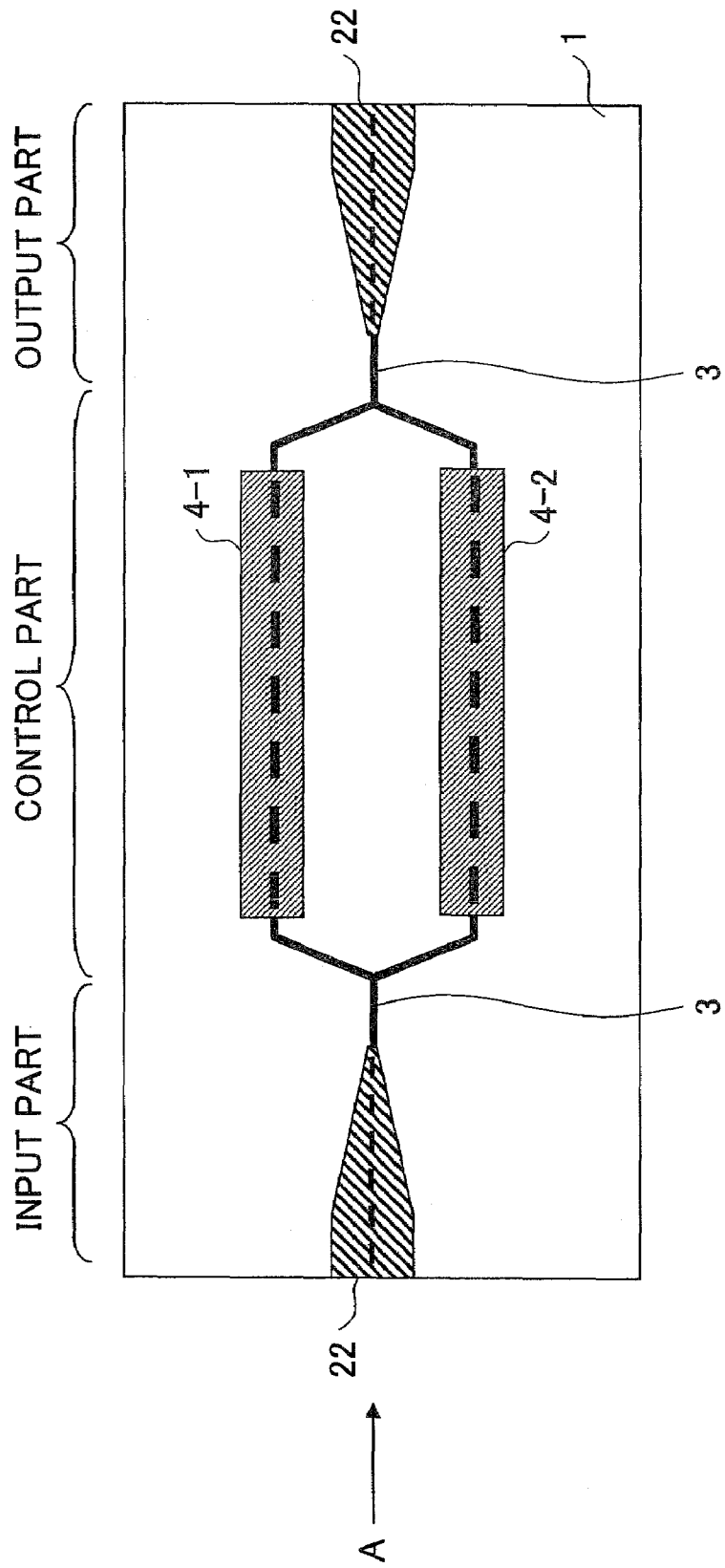
FIG. 6 is a plan view showing a schematic structure of an optical device of a second embodiment of the present invention.
Figure 7:
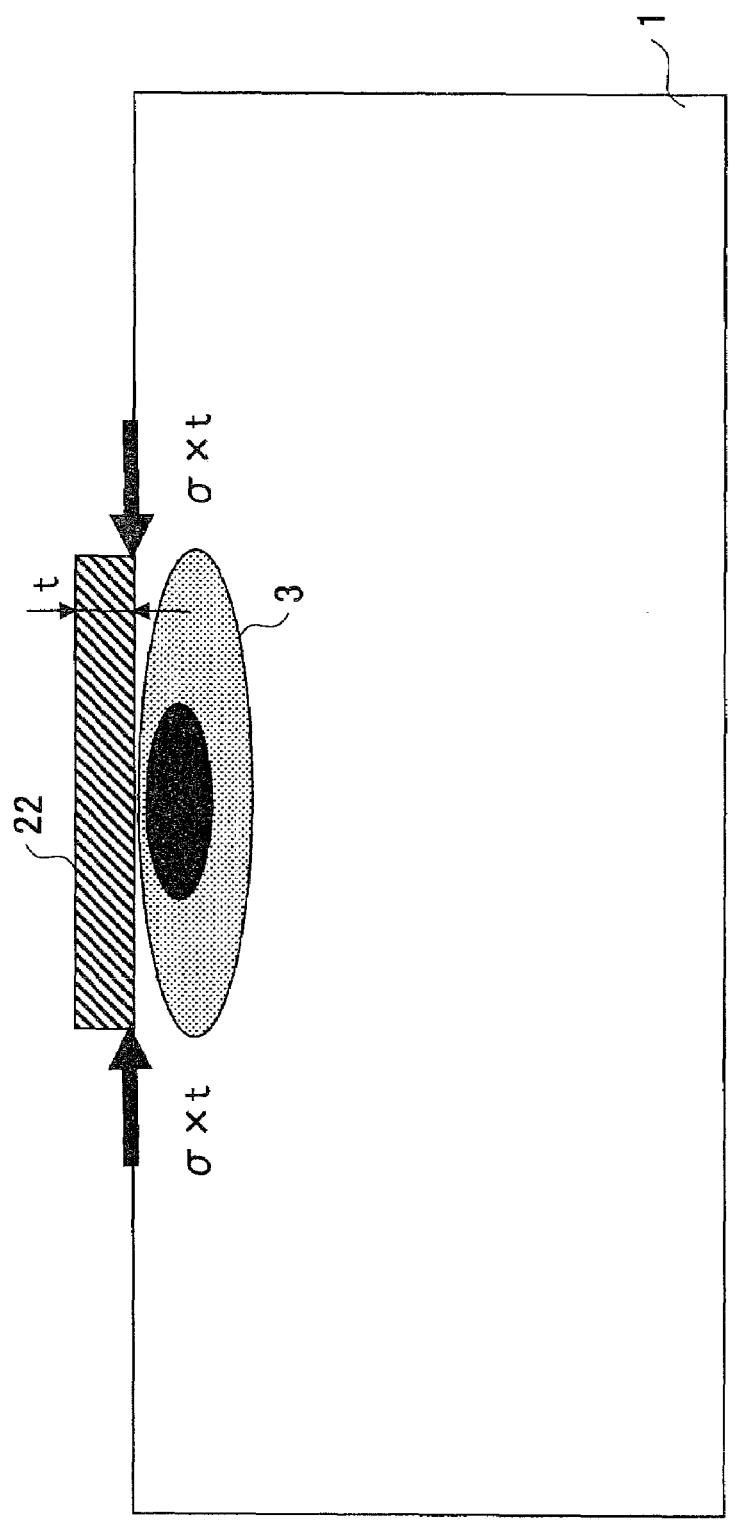
FIG. 7 is a schematic view seen in a direction shown by an arrow A of the optical device shown in FIG. 6.

FIG. 6 is a plan view showing a schematic structure of an optical device of a second embodiment of the present invention. FIG. 7 is a schematic view seen in a direction shown by an arrow A of the optical device shown in FIG. 6. In FIG. 6 and FIG. 7, parts that are the same as the parts shown in the first embodiment of the present invention are given the same reference numerals, and explanation thereof is omitted.

In the above-discussed first embodiment of the present invention, as shown in FIG. 4, the stress layers 2-1 and 2-2 are patterned and provided at the input and output parts so that the diffusion waveguide 3 is put between the stress layers 2-1 and 2-2. On the other hand, in the second embodiment of the present invention, as shown in FIG. 6 and FIG. 7, patterning reverse of the patterning in the first embodiment of the present invention is made. A stress layer 22 is provided on the diffusion waveguide 3 and makes the diffusion waveguide 3 have a stress inducing the change of the index of refraction due to the photoelastic effect.

In other wards, a stress "σ×t (t: thickness of the stress layer 22)" is applied to the diffusion waveguide 3 so that contraction strain acts on a surface of the diffusion waveguide 3. As a result of this, the change of the index of refraction is induced due to the electrooptic effect and therefore the index of refraction of the surface of the substrate 1 is decreased.

In the second embodiment of the present invention, as well as the first embodiment of the present invention, it is necessary to improve the application efficiency of an electric field in the control part. Therefore, it is preferable to make the light intensity distribution lean toward the vicinities of the electrodes 4-1 and 4-2 having large strengths of the application electric fields, namely make the light intensity distribution lean toward the surface of the substrate like a normal diffusion waveguide.

Because of this, the stress layer 22 is provided only at the input and output parts and not provided at the control part. At the input and output parts, the width of the stress layers 22 are formed in taper shapes so as to be narrower as a position approaches the control part. As a result of this, the stress applied by the stress layer 22 is gradually weakened and changed so that the coupling loss is prevented.

Figure 8:
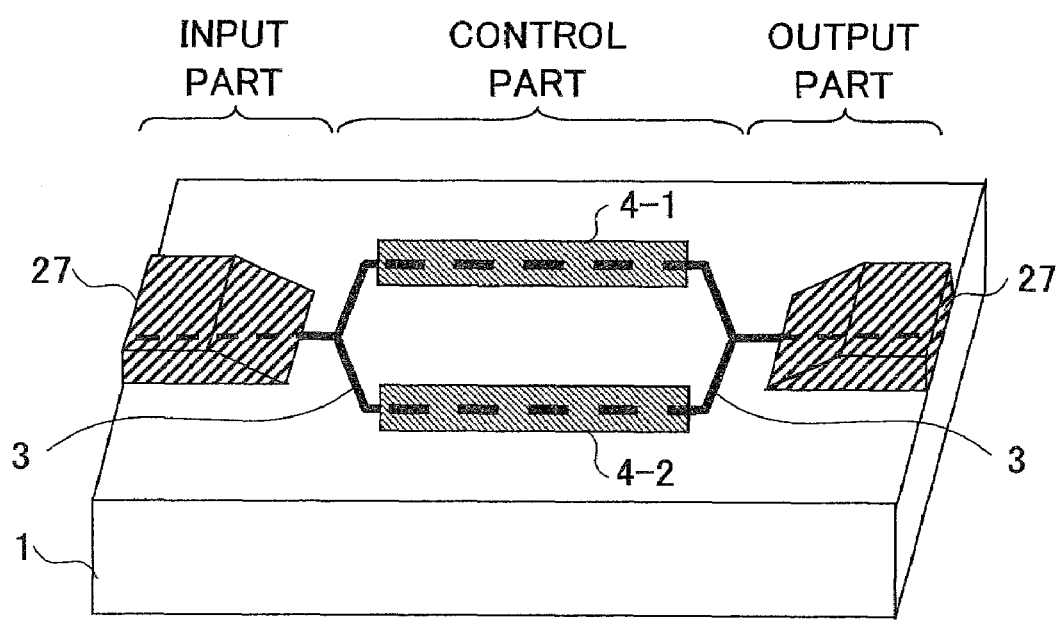
FIG. 8 is a perspective view of an optical device of a modified example of the second embodiment of the present invention.

FIG. 8 is a perspective view of an optical device of a modified example of the second embodiment of the present invention.

Referring to FIG. 8, in the second embodiment of the present invention, as well as the first embodiment of the present invention, as a modified example of the example shown in FIG. 6, the thickness of stress layer 27 may be formed in a taper shape at the input and output parts so as to be thinner as the position approaches the control part. In a structure of this example, the stresses applied by the stress layer 27 can be gradually weakened and changed so that the same effect as that of the example shown in FIG. 6 can be achieved.

In this example, unlike the first embodiment of the present invention, when the substrate 1 is made of a material having a positive photoelastic coefficient, a material having a coefficient of thermal expansion smaller than that of the substrate 1 is selected for the stress layers 22 (27) ($\alpha_s > \alpha_f$). By generating the constriction stress σ having a negative value at the substrate 1 and making the generated strain S have a negative value (constriction strain), it is possible to decrease the index of refraction.

On the other hand, when the substrate 1 is made of a material having a negative photoelastic coefficient, a material having a coefficient of thermal expansion smaller than that of the substrate 1 ($\alpha_s < \alpha_f$) is selected as the stress layers 22 (27). As a result of this, it is possible to decrease the index of refraction.

Figure 9:
FIG. 9 is a table with respect to combinations of a material used for the substrate and a material used for a stress layer and applications of structures of the embodiments of the present application to the combinations.

Here, a table with respect to combinations of a material used for the substrate and a material used for a stress layer and applications of structures of the embodiments of the present application to the combinations is shown in FIG. 9.

FIG. 9-(a) is a table showing photoelastic coefficients "p" and coefficients of thermal expansion "$\alpha_s$ (1/° C.)" of materials used for the substrate 1.

For example, in a case where the substrate 1 is made of lithium niobate (LiNbO$_3$), the photoelastic coefficient "p" is positive and the coefficient of thermal expansion "$\pi_s$" is 15×10$^{-6}$ (1/° C.). In a case where the substrate 1 is made of lithium tantalate (LiTaO$_3$), the photoelastic coefficient "p" is positive. The cases where the substrate 1 is made of lithium niobate (LiNbO$_3$) and the case where the substrate 1 is made of lithium tantalate (LiTaO$_3$) are classified as a classification "A". In a case where the substrate 1 is made of gallium arsenide (GaAs), the photoelastic coefficient "p" is negative. The case where the substrate 1 is made of gallium arsenide (GaAs) is classified as a classification "B".

FIG. 9-(b) shows coefficients of thermal expansion "$\alpha_f$" of materials applied as the stress layer 2 (2') or 22 (27) and combinations of the classifications of the applied substrate and corresponding embodiments of the present application.

In FIG. 9-(b), as examples of the materials for the stress layer 2 (2') or 22 (27), aluminum (Al), polyimide, silicon oxide (SiO$_2$), and nitride silicon (SiN) are used.

For example, in a case where (1) aluminum (Al) having coefficient of thermal expansion "$\alpha_f$" of 27×10$^{-6}$ (1/° C.) is applied as the material of the stress layer; and (2) the substrate 1 belongs to the classification A, that is the substrate 1 is made of lithium niobate (LiNbO$_3$) or lithium tantalate (LiTaO$_3$) having the positive photoelastic coefficients "p", the structure of the first embodiment of the present invention discussed with reference to FIG. 3 through FIG. 5 is applied.

In addition, in a case where (1) aluminum (Al) is applied as the material of the stress layer; and (2) the substrate 1 belongs to the classification B, that is the substrate 1 is made of gallium arsenide (GaAs) having the negative photoelastic coefficients "p", the structure of the second embodiment of the present invention discussed with reference to FIG. 6 through FIG. 8 is applied.

In either case, the change of the index of refraction can be induced by the electrooptic effect and the reducing degree of the index of refraction can be made large, on the surfaces of the input part and the output part. In addition, in either case, the light intensity distribution can be leaned toward the vicinities of the electrodes 4-1 and 4-2 by the control part.

Figure 10:
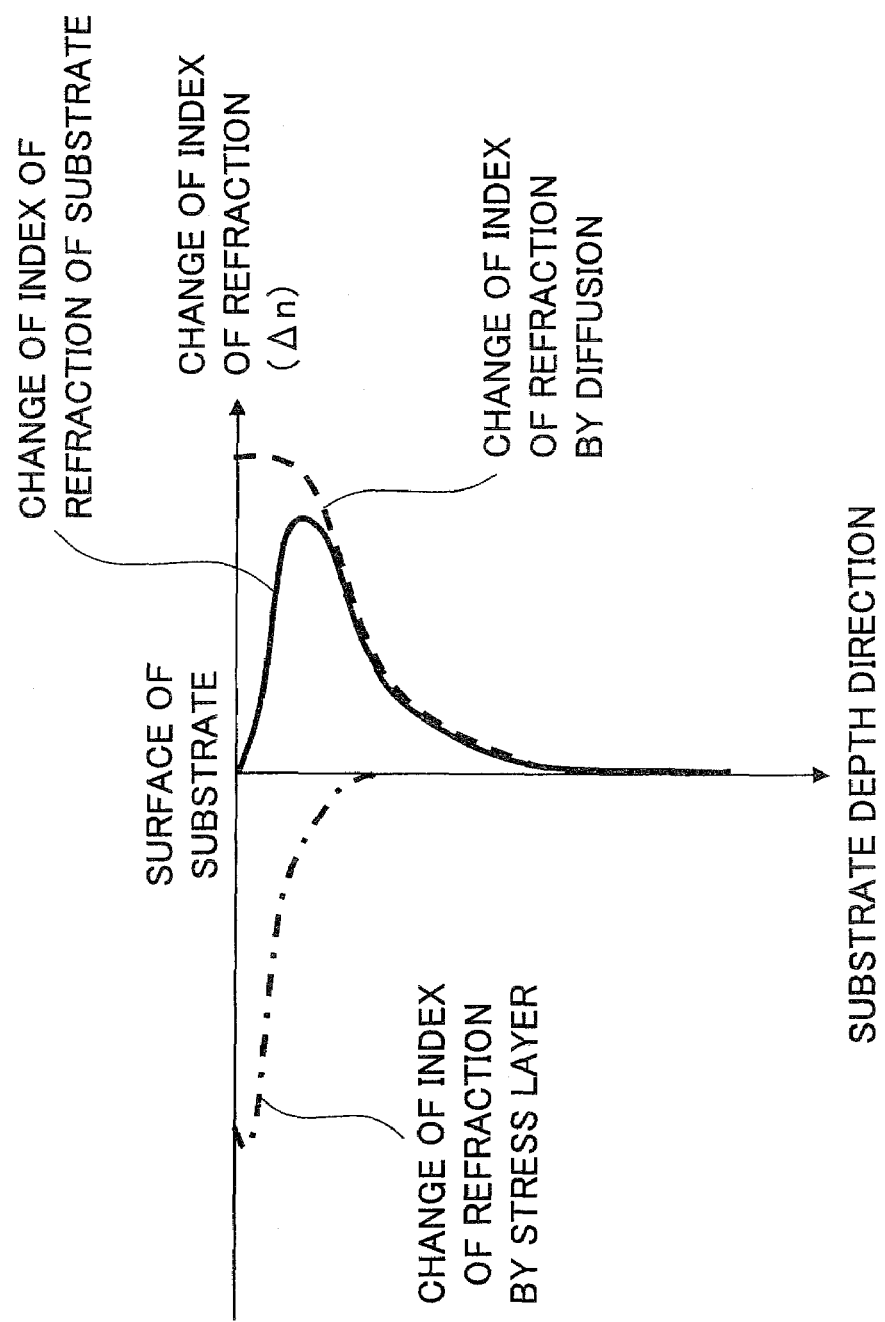
FIG. 10 is a graph showing a distribution of change of the index of refraction in the direction perpendicular to the substrate in the embodiment of the present invention.
Figure 11:
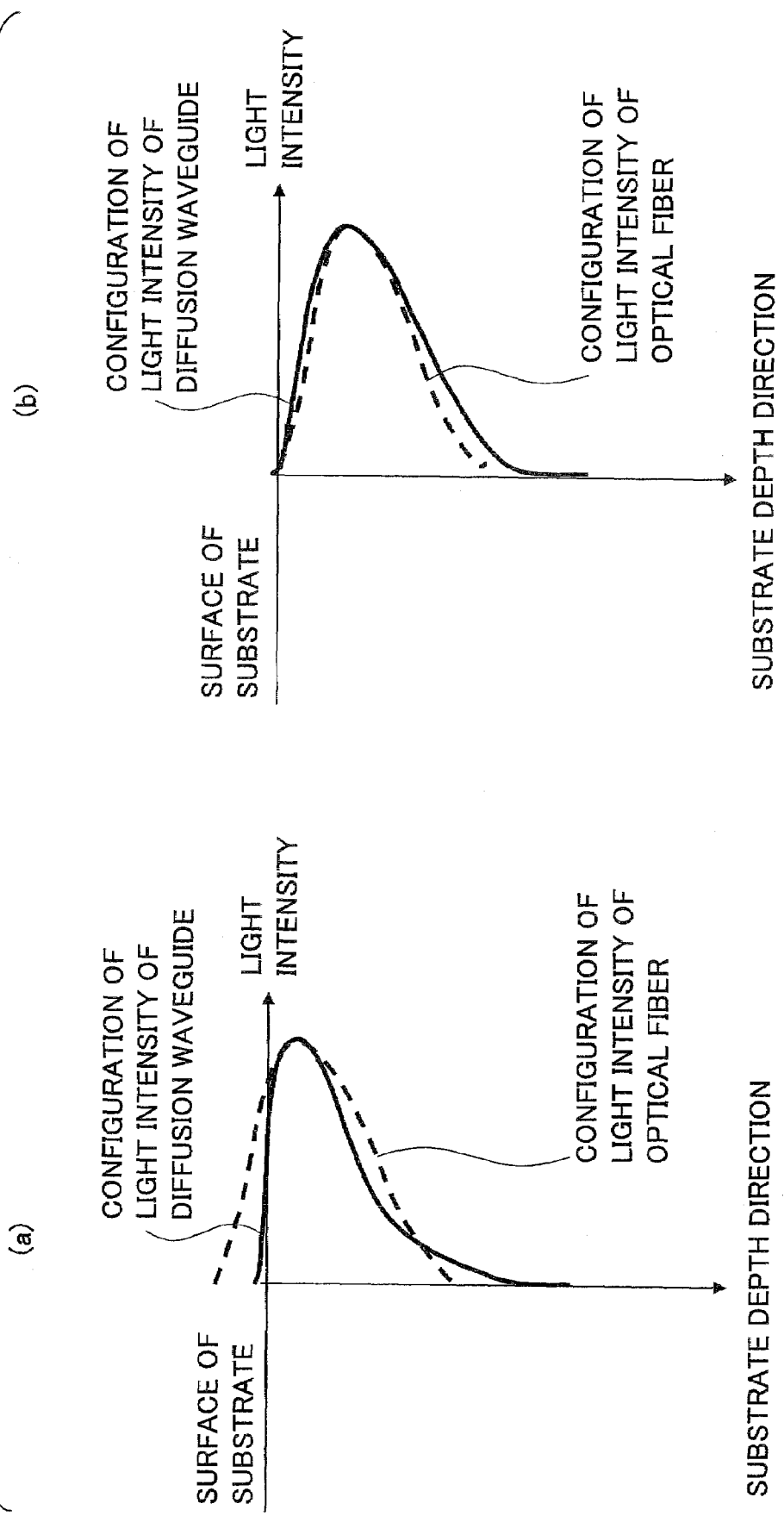
FIG. 11 is a graph showing a light intensity distribution of a diffusion waveguide of the embodiment of the present invention by comparing the related art.

Next, an effect of the embodiments of the present invention is discussed with reference to FIG. 10 and FIG. 11. Here, FIG. 10 is a graph showing a distribution of change of the index of refraction in the direction perpendicular to the substrate in the embodiment of the present invention. FIG. 11 is a graph showing a light intensity distribution of a diffusion waveguide of the embodiment of the present invention by comparing the related art.

Figure 1:
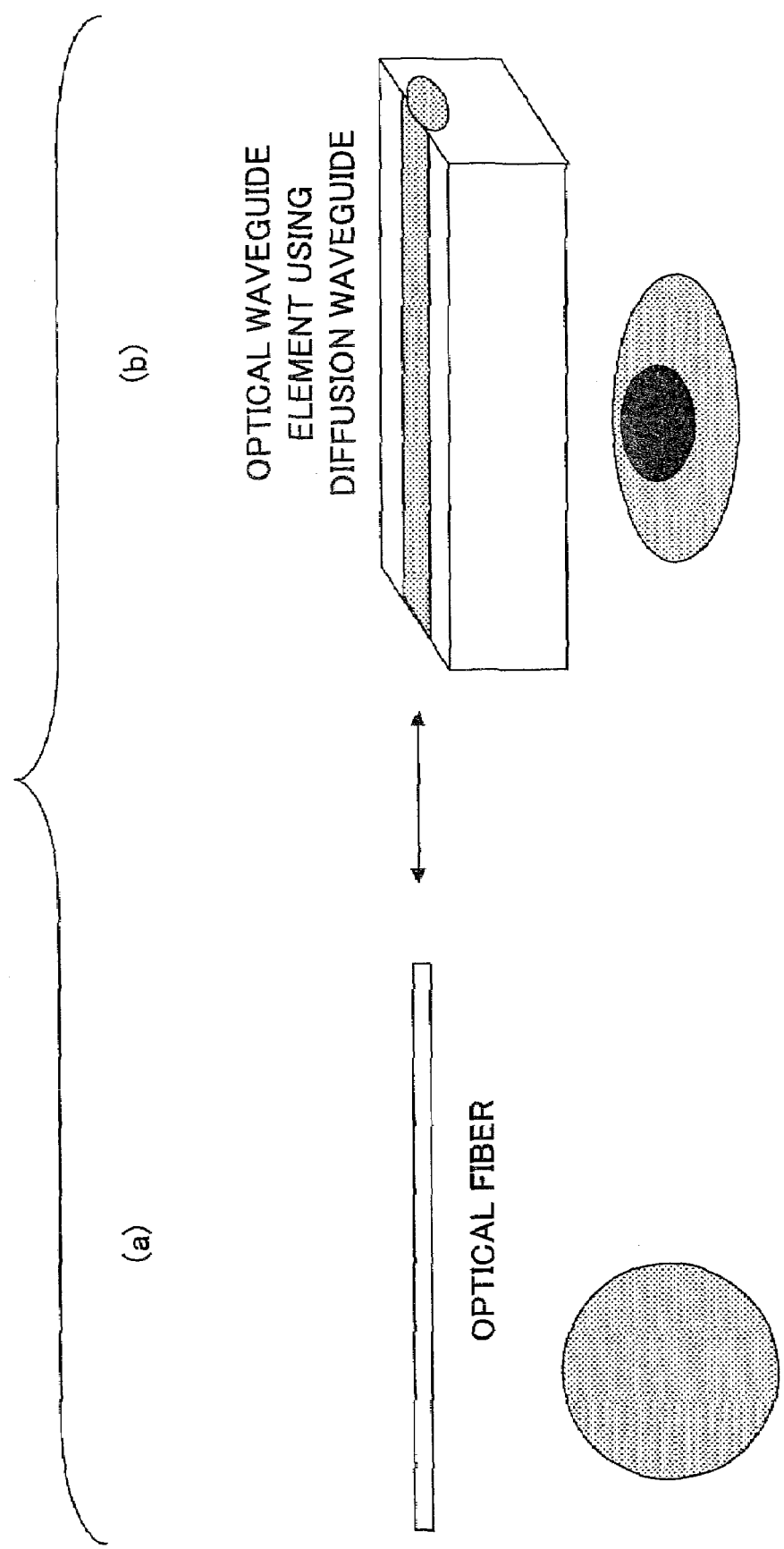
FIG. 1 is a schematic view showing a light intensity distribution of light propagating in an optical fiber and a light intensity distribution of light propagating in a diffusion waveguide of an optical waveguide element, in the related art.
Figure 2:
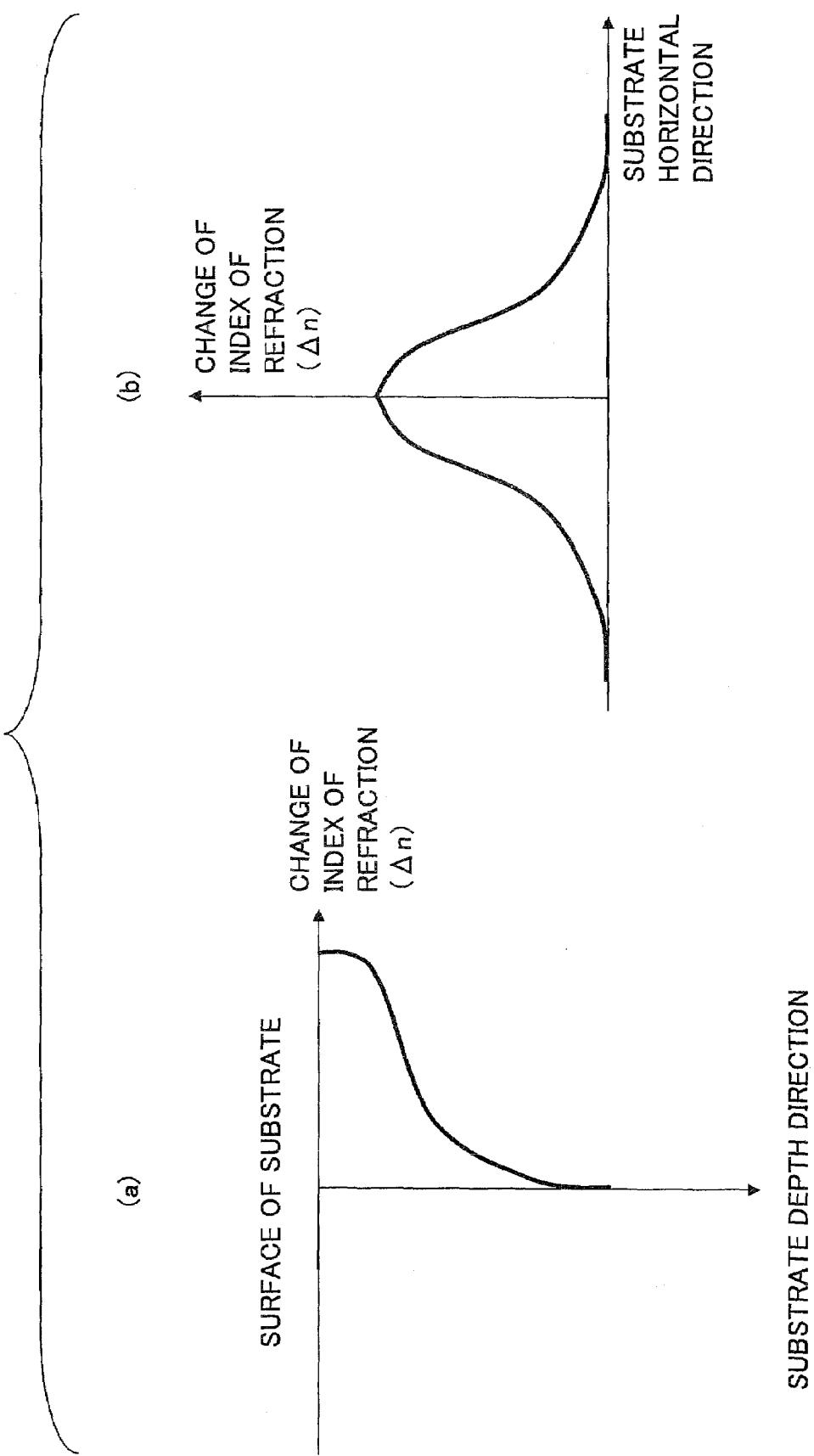
FIG. 2 is a graph of distribution of change of an index of refraction in a direction perpendicular to or parallel to a substrate in the related art optical device.

First, referring to FIG. 10, a dashed line shows a distribution shown in FIG. 2-(a), namely a distribution of the change of the index of refraction in a direction perpendicular to the substrate (substrate depth direction) of the optical device having no stress layer 2 (2') or 22 (27) of the embodiments of the present invention.

As discussed above, in a case where the stress layer 2 (2') or 22 (27) is not provided, distribution of the change of the index of refraction in the direction perpendicular to the substrate (substrate depth direction) leans toward the surface of the substrate.

However, by providing the stress layer 2 (2') or 22 (27) of the embodiments of the present invention, as shown by the one-dotted line, the change of the index of refraction due to the stress layer 2 (2') or 22 (27) is generated. As a result of this, as shown by a solid line, change of the index of refraction being substantially symmetrical with respect to a peak point can be obtained.

The distribution of the light intensity in the direction perpendicular to the substrate (substrate depth direction), the distribution corresponding to the change of the index of refraction, is shown in FIG. 11.

More specifically, the distribution of the light intensity of the optical fiber and the distribution of the light intensity at the diffusion waveguide in a case where the stress layer 2 (2') or 22 (27) is not provided, are shown in FIG. 11-(*a*). The distribution of the light intensity of the optical fiber and the distribution of the light intensity at the diffusion waveguide in a case where the stress layer 2 (2') or 22 (27) is provided, are shown in FIG. 11-(*b*).

In FIG. 11, a dashed line shows the distribution of the light intensity of the optical fiber and a solid line shows the distribution of the light intensity at the diffusion waveguide.

Referring to FIG. 11-(*a*), in the case where the stress layer 2 (2') or 22 (27) is not provided, the distribution of the light intensity at the diffusion waveguide leans toward the surface of the substrate. Hence, the distribution of the light intensity at the diffusion waveguide is not consistent with the distribution of the light intensity of the optical fiber.

Referring to FIG. 11-(*b*), in the case where the stress layer 2 (2') or 22 (27) is provided, as the distribution of the light intensity at the diffusion waveguide, a distribution corresponding to the change of the index of refraction shown in FIG. 10, is obtained. Hence, the distribution of the light intensity at the diffusion waveguide is substantially consistent with the distribution of the light intensity of the optical fiber.

The coupling loss can be expressed by an overlap integral of the distribution of the light intensity of the optical fiber and the distribution of light intensity of the diffusion waveguide.

In the case where the stress layer 2 (2') or 22 (27) is provided, the distribution of the light intensity of the diffusion waveguide becomes similar to the substantially circular shaped distribution being substantially symmetric with respect to a peak point.

Therefore, the overlap of the distribution of the light intensity of the diffusion waveguide and the distribution of the light intensity of the optical fiber becomes large so that the coupling loss is decreased.

Thus, in the above-discussed embodiments of the present invention, since the stress layer 2 (2') or 22 (27) is provided at the input and output parts, namely a part connecting the optical device and the optical fiber, the distribution of the light intensity at the diffusion waveguide is made substantially consistent with the corresponding distribution of light intensity of the optical fiber so that the coupling loss with the optical fiber can be made small.

In addition, since the stress layer 2 (2') or 22 (27) is provided at the control part, the light intensity can be leaned toward the vicinity of the electrode on the surface so that high electric field application efficiency can be obtained.

3. Third Embodiment of the Present Invention

In the above-discussed embodiments of the present invention, the present invention is applied to the waveguide (mainly, diffusion waveguide) wherein the distribution of the light intensity is leaned toward the surface of the substrate.

However, the present invention is not limited to these examples. The present invention may be applied to other asymmetric optical waveguides. For example, a three dimensional optical waveguide can be formed at an optical depth of the substrate by making convergent radiotherapy of a high intensity laser such as Femto second laser to the dielectric substrate. In this case, generally, the formed optical waveguide has an elliptic-shaped configuration.

Figure 12:
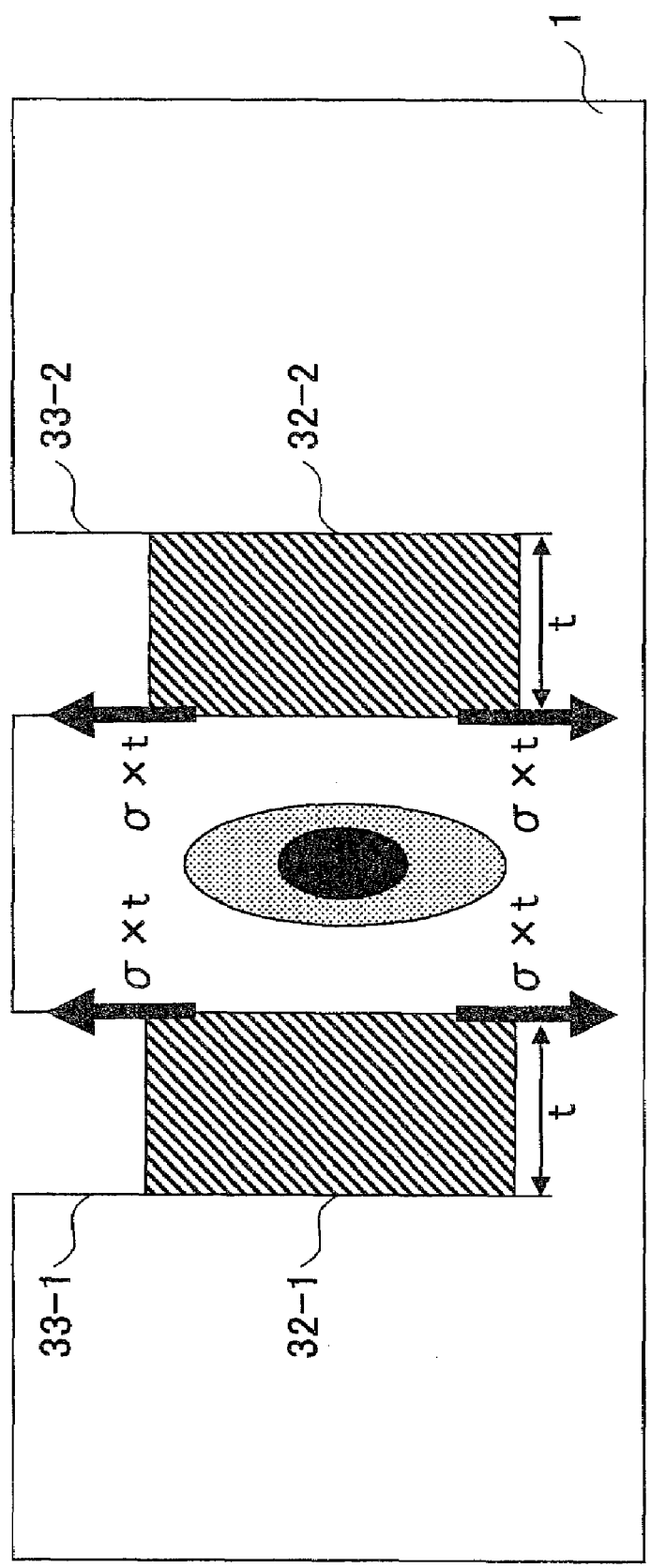
FIG. 12 is a cross-sectional view of input and output parts of an optical device of a third embodiment of the present invention.

An example of a case where the present invention is applied to an elliptic waveguide having optional depth is shown in FIG. 12. Here, FIG. 12 is a cross-sectional view of input and output parts of an optical device of a third embodiment of the present invention.

At the input and output parts, groove forming parts 33-1 and 33-2 are formed in the dielectric substrate 1 by dry etching such as RIE (Reactive Ion Etching). Stress layers 32-1 and 32-2 are stacked in the groove forming parts 33-1 and 33-2.

As shown in FIG. 12, by stresses applied to side surface parts of the groove forming parts 33-1 and 33-2, it is possible to adjust the distribution of the light intensity to a substantially circular shape and reduce the coupling loss with the optical fiber. Here, as shown in FIG. 12, layer thickness "t" of the stress layers 32-1 and 32-2 are substantially constant (the stress is proportional to the layer thickness.).

Figure 13:
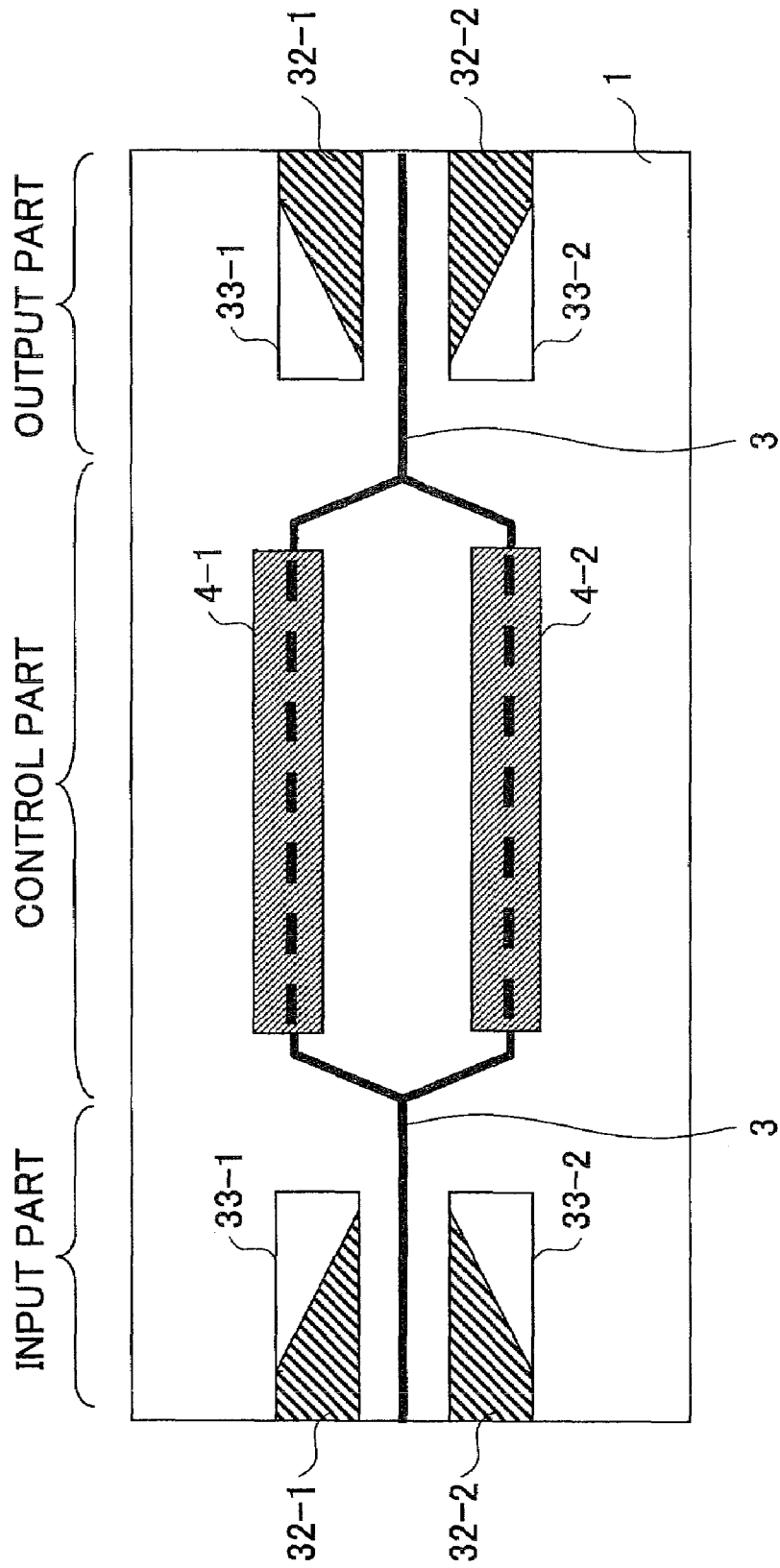
FIG. 13 is a plan view showing a schematic structure of the optical device of the third embodiment of the present invention.

In this case, as shown in FIG. 13, the width of the stress layers 32-1 and 32-2 can be formed in the taper shapes. Here, FIG. 13 is a plan view showing a schematic structure of the optical device of the third embodiment of the present invention.

A selection way and structure of the stress layers 32-1 and 32-2 can be implemented in the same way as the first and second embodiments of the present invention.

It should be noted that the examples shown in FIG. 12 and FIG. 13 are just examples of the present invention. By combining embodiment of the present invention, it is possible to make any elliptic waveguide have a substantially circular shaped light intensity distribution.

The present invention is not limited to these embodiments, but variations and modifications may be made without departing from the scope of the present invention.

For example, in the above-discussed embodiments of the present invention, the width or thickness of the stress layer 2 (22) or 2' (27) is formed in the taper shape so as to be narrower or thinner as a position approaches the control part. However, the present invention is not limited to these examples. As long as the stress applied by the stress layer 2 (22) or 2' (27) can be gradually weakened and changed as the position approaches the control part, there is no limitation of the angle or configuration of the taper.

In addition, a buffer layer formed by a thin film made of, for example, silicon oxide ($SiO_2$) may be provided between the modulating electrodes 4-1 and 4-2 and the upper surface of the substrate 1 where the diffusion waveguide 3 is provided. By such a buffer layer, it is possible to prevent absorption of light due to the modulating electrodes 4-1 and 4-2.

This patent application is based on Japanese Priority Patent Application No. 2006-123701 filed on Apr. 27, 2006, the entire contents of which are hereby incorporated by reference.

What is claimed is:

1. An optical device wherein an optical waveguide is formed on a dielectric substrate, the optical device comprising:
   an input part and an output part where the optical waveguide and corresponding optical fibers are connected;
   wherein a stress layer is provided for at least one of the input part and the output part;
   the stress layer applies a stress to the optical waveguide so that an index of refraction of the optical waveguide is reduced;
   the stress applied to the optical waveguide is weakened as a position approaches from the at least one of the input part and the output part to a control part where an electrode is provided; and
   wherein thickness of the stress layer is formed in a taper shape.

2. An optical device wherein an optical waveguide is formed on a dielectric substrate, the optical device comprising:
   an input part and an output part where the optical waveguide and corresponding optical fibers are connected;
   wherein a stress layer is provided for at least one of the input part and the output part;
   the stress layer applies a stress to the optical waveguide so that an index of refraction of the optical waveguide is reduced;
   the thickness of the stress layer is formed in a taper shape; and
   the stress applied to the optical waveguide is weakened as a position approaches from the at least one of the input part and the output part is provided.

3. The optical device as claimed in claim 2,
   wherein the stress layer reduces the index of refraction in the vicinity of a surface of the at least one of the input part and the output part.

4. The optical device as claimed in claim 2,
   wherein the stress applied to the optical waveguide is formed by a thermal stress of the stress layer.

5. The optical device as claimed in claim 2,
   wherein
   the stress applied to the optical waveguide is weakened as a position approaches from the at least one of the input part and the output part to a control part where an electrode is provided.

6. The optical device as claimed in claim 5,
   wherein width of the stress layer is formed in a taper shape.

7. The optical device as claimed in claim 2,
   wherein the dielectric substrate is made of lithium niobate or lithium tantalate; and
   the stress layer is made of aluminum or polyimide.

8. The optical device as claimed in claim 2,
   wherein the optical waveguide is put between a plurality of the stress layers at the at least one of the input part and the output part, in a case where the dielectric substrate is made of a material having a negative photoelastic coefficient and a coefficient of thermal expansion of the stress layer is smaller than a coefficient of thermal expansion of the dielectric substrate.

9. The optical device as claimed in claim 8,
   wherein the dielectric substrate is made of gallium arsenide; and
   the stress layer is made of silicon oxide or silicon nitride.

10. The optical device as claimed in claim 2,
    wherein the stress layer is provided on the optical waveguide at the at least one of the input part and the output part, in a case where the dielectric substrate is made of a material having a positive photoelastic coefficient and a coefficient of thermal expansion of the stress layer is smaller than a coefficient of thermal expansion of the dielectric substrate.

11. The optical device as claimed in claim 10,
    wherein the dielectric substrate is made of lithium niobate or lithium tantalate; and
    the stress layer is made of silicon oxide or silicon nitride.

12. The optical device as claimed in claim 2,
    wherein the stress layer is provided on the optical waveguide at the at least one of the input part and the output part, in a case where the dielectric substrate is made of a material having a negative photoelastic coefficient and a coefficient of thermal expansion of the stress layer is larger than a coefficient of thermal expansion of the dielectric substrate.

13. The optical device as claimed in claim 12,
    wherein the dielectric substrate is made of gallium arsenide; and
    the stress layer is made of aluminum or polyimide.

14. The optical device as claimed in claim 2,
    wherein the optical waveguide is put between a plurality of the stress layers at the at least one of the input part and the output part, in a case where the dielectric substrate is made of a material having a positive photoelastic coefficient and a coefficient of thermal expansion of the stress layer is larger than a coefficient of thermal expansion of the dielectric substrate.

* * * * *